(12) United States Patent
Taylor (10) Patent No.: US 12,520,974 B2
(45) Date of Patent: Jan. 13, 2026

(54) TOILET SUPPORT FRAME

(71) Applicant: Gillian Taylor, Cleland (GB)

(72) Inventor: Gillian Taylor, Cleland (GB)

( * ) Notice: Subject to any disclaimer, the term of this patent is extended or adjusted under 35 U.S.C. 154(b) by 703 days.

(21) Appl. No.: 17/777,555

(22) PCT Filed: Nov. 18, 2020

(86) PCT No.: PCT/EP2020/082590
§ 371 (c)(1),
(2) Date: May 17, 2022

(87) PCT Pub. No.: WO2021/099421
PCT Pub. Date: May 27, 2021

(65) Prior Publication Data
US 2022/0395150 A1    Dec. 15, 2022

(30) Foreign Application Priority Data

Nov. 18, 2019  (GB) ..................... 1916779

(51) Int. Cl.
*A47K 17/02*       (2006.01)
*G01G 19/52*       (2006.01)

(52) U.S. Cl.
CPC ........... *A47K 17/028* (2013.01); *G01G 19/52* (2013.01)

(58) Field of Classification Search
CPC ........ A47L 17/028; A47L 19/44; G01G 19/52
USPC .......................................................... 177/1
See application file for complete search history.

(56) References Cited

U.S. PATENT DOCUMENTS

| | | | | |
|---|---|---|---|---|
| 3,611,449 | A * | 10/1971 | Berry | A47K 13/00 4/480 |
| 5,526,537 | A * | 6/1996 | Conrad | A47K 11/04 297/188.12 |
| 7,078,630 | B2 * | 7/2006 | Martin-Woodin | G01G 19/44 177/144 |
| 9,595,185 | B1 | 3/2017 | Hall et al. | |
| 12,089,955 | B2 * | 9/2024 | Conn | A61B 5/1102 |
| 2019/0290079 | A1 * | 9/2019 | Takaki | A61B 5/4872 |

FOREIGN PATENT DOCUMENTS

| | | | | |
|---|---|---|---|---|
| CN | 104970730 | * | 10/2015 | |
| CN | 210902777 | * | 7/2020 | |
| DE | 19840685 A1 * | | 4/1999 | G01G 19/44 |
| DE | 202007014938 U1 | | 1/2008 | |
| WO | WO-2016051149 A1 * | | 4/2016 | A47K 11/04 |

* cited by examiner

*Primary Examiner* — Jacques M Saint Surin
(74) *Attorney, Agent, or Firm* — Craft Chu PLLC; Andrew W. Chu (57) ABSTRACT

A toilet frame can measure the weight of a patient when the patient is sat on the toilet frame. The toilet frame includes a support frame and a seat mounted on the support frame. The seat includes an aperture for receiving bodily fluids such that the patient may go to the toilet. The toilet frame further includes a foot plate for supporting the patient's feet. Weight sensors are positioned under the seat and the foot plate such that when a patient sits on the toilet frame the weight of the patient may be measured.

20 Claims, 11 Drawing Sheets

TOILET SUPPORT FRAME

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present disclosure relates to a toilet support frame and in particular, but not exclusively, to a toilet support frame for weighing a user whilst the user is sat on the toilet support frame. Aspects of the invention relate to a toilet frame for weighing a patient, to a commode comprising a toilet frame and to a method of weighing a patient using a toilet frame.

2. Description of Related Art Including Information Disclosed Under 37 CFR 1.97 and 37 CFR 1.98

Aging of the population in many developed countries has led to an increased number of infirm patients who may in addition be confused and uncooperative. Moving or manual handling an old, infirm or uncooperative patient can cause distress and tends to involve numerous medically trained staff. Moving or manually handling patients can be associated with a risk of injury, especially as older patients have a higher risk of brittle bones.

Measuring and recording the weight of a patient is a fundamental role in care for patients and care home residents. It is an important assessment for the overall health and wellbeing of a patient, for calculating drug dosages, for calculating fluid balance and for determining the nutritional status of the patient. Physical weighing of patients in the hospital and care environment can prove difficult due to department pressures, lack of suitable equipment and patient presentation. Often an accurate weight is not obtained for patients and guessing the patient's weight is common practice. This can have adverse effects on the patient's outcome, recovery and also lead to harm for the patient.

Following admission to hospital, patients' weight can vary significantly, and this can be particularly acute for older patients including those suffering from dementia as they can have a tendency to refuse food. In addition, a higher than average proportion of older patients have difficulty swallowing leading to weight loss. As such, Nice Guidelines (2206) state that each patient should be weighed on admission to hospital and subsequently weighed weekly or more often if there is a clinical concern.

Furthermore, the dose of many medicaments is dependent on the weight of the patient. However, it is currently difficult to measure a patient's weight quickly and accurately where they are unable to stand. As such, the efficacy of drugs may be reduced if the wrong dose is administered, and the risk of side-effects is increased.

Elderly patients have limited mobility for undertaking activities of daily living, they can have impaired balance, visual impairment, reduced muscle strength and poor reaction times. All of these factors make elderly patients susceptible to injuries resulting from falls. Falls amongst patients in hospitals and care sectors are the most frequently reported safety issues, 30%-50% of falls result in some physical injury and fractures occur in between 1%-3% of falls. However, no fall is totally harmless and falls without physical injury still lead to a loss of confidence, delays in functional recovery and prolonged hospital stays.

There are many different weighing devices available such as chair scales and stand on scales. However, weighing a patient on either a set of chair scales or stand on scales involves moving a patient unnecessarily to be weighed. This is undesirable as moving an elderly or frail patient increases the chance of the patient falling and injuring themselves. As such there is a need for a device capable of weighing a patient without requiring any additional journeys or steps to move a patient.

Although weighing devices such as hoists are available in hospitals, these involve placing the patient in the hoist and lifting the patient off the bed/trolley in order for a weight to be taken. This is time consuming, requires suspension of the patient, with consequent safety issues e.g. hoists can topple if not used appropriately. Alternatively, floor scales can be used which weigh both patient and trolley. Floor scales tend to be extremely heavy, thus non-portable, and need to be large enough to accommodate a trolley. Both the aforementioned methods require considerable space, and a considerable number of staff, both of which are often at a premium in hospitals and care homes.

There remains a need for a method and device to weigh old and infirm patients with a minimum of medical intervention. It is an aim of the present invention to address one or more of the disadvantages associated with the prior art.

BRIEF SUMMARY OF THE INVENTION

According to an aspect of the present invention there is provided a toilet frame or commode for measuring the weight of a patient when the patient is sat on the toilet frame, the toilet frame comprising: a support frame; a seat mounted on the support frame, the seat comprising an aperture for receiving bodily fluids; and a foot plate for supporting the patient's feet; wherein the toilet frame further comprises a weight sensor configured to measure the weight of the patient when the patient is sat on the seat.

The invention advantageously allows the weight of a patient to be measured whilst the patient is sat on the toilet support frame scale. As such, the weight of the patient may be measured when the patient is going to the toilet using the toilet frame thereby removing the requirement to move a patient from their bed to be weighed on a conventional pair of scales. This is particularly beneficial for patients who are immobile. For example, elderly patients, patients who are unsteady on their feet or patients who are weak and unable to be moved easily from their bed. As such, the patient may be moved from their bed to go to the toilet and to be weighed in a single journey.

The invention beneficially allows patients who are recovering in hospital and patients who are frail and at risk of falls but not immobile to be weighed as part of an existing process of going to the toilet. Furthermore, due to hospital guidelines patients are encouraged to get up and mobilise day one after surgery. The integrated raised toilet frame scale with incorporated commode allows the patient to get up to the toilet whilst recovering and getting a weight at the same time. The invention beneficially reduces steps in the process, reduces manual handling of the patient, reduces risks of falls, reduced staff time and will increase accurate weights for patients as part of an existing routine/process of going to the toilet. This will also help reduce pressure on staff time as accurate weights for patients will be part of an already existing task. Providing a solution to the problem of poorly documented weights or guessing weights for patients ultimately reducing the risk of potential harm.

The footplate provides a surface upon which a patient may place or rest their feet. This is beneficial as the component of the patient's weight being loaded on the foot plate may be measured by a weight sensor and used in combination with a weight applied to the seat by the patient to determine the total weight of the patient. The support frame may be a support frame for positioning and supporting the toilet frame over a toilet.

The seat may be mounted on the support frame indirectly. For example, the seat may be mounted on the weight sensor and then mounted on the support frame or the seat may be mounted on an upper support frame which is subsequently attached to the support frame.

In an embodiment the weight sensor may be disposed between the seat and the support frame. Disposing the weight sensor between the seat and the support frame is beneficial as a load path between the seat and the support frame that extends through the weight sensor may be defined such that the weight sensor may determine the weight of a patient sat on the seat. Furthermore, the seat may be secured to the support frame via the weight sensor.

In another embodiment the toilet frame may comprise an upper support frame mounted on the support frame by the weight sensor such that a load path extends from the upper support frame to the support frame via the weight sensor. The seat may be secured to the upper support frame. The upper support frame may be secured to the support frame by the weight sensor. The weight sensor may comprise one or more weight sensors disposed between the upper support frame and the support frame.

In one embodiment the upper support frame may comprise a pair of arm rests. A back rest may extend between the pair of arm rests. The arm rests may form part of the upper support frame. A patient sat on the toilet frame may rest their arms on the arm rests and the load applied to the arm rests by the patient may be transferred to the one or more weight sensors along the load path extending between the upper support frame and the support frame. The arm rests further assist a patient when sitting on or standing from the toilet frame. The arm rests provide a surface that the patient may grip such that the patient can use their arms to assist sitting or standing from the seat.

In an embodiment a display may be mounted on one of the arm rests for displaying the weight of the patient. This is beneficial as the display may be positioned beside the patient such that the patient's weight may be displayed and easily read by a health care worker. Furthermore, the patient may also be able to look down to see their weight whilst they are sat on the toilet frame.

In another embodiment the upper support frame may comprise a pair of upper struts. The upper struts may extend laterally between the arm rests. The upper struts beneficially strengthen the upper support frame and provide a surface for mounting the seat of the toilet frame on. The seat may form part of the upper support structure.

In one embodiment the support frame may comprise a pair of lower struts. The lower struts may extend laterally between opposing legs of the support frame. Each lower strut may be aligned vertically with a respective upper strut. A gap may be disposed between the lower support strut and the upper support strut.

In an embodiment the seat may be mounted on the pair of upper struts. This is beneficial as the seat may form part of the upper support structure and loads applied to the seat by a patient sat on the seat may be passed to the support frame via the load path extending through the weight sensor. The seat may comprise one or more slots for receiving the pair of upper struts. For example, the seat may comprise two pairs of slots. Each of the lower and upper struts may be at least partially received within a respective slot. The lower and upper struts may extend between slots located on opposing sides of the seat. An upper surface of the slot may rest on a top surface of the upper support strut.

In a further embodiment a plug may at least be partially received within a gap defined between the lower strut and the upper strut. The plug may lie substantially flush with an outer surface of the seat. This is beneficial as the plug may provide a smooth outer surface that can be cleaned easily. Furthermore, the plug prevents ingress of moisture within the seat. The plug may be made from a soft plastics material to allow the seat to move vertically in the z-axis when a patient sits on the seat. This is beneficial as the plug may deform to minimise the load passed through the plug such that substantially all of the load of the patient is passed through the weight sensor when the patient sits on the seat.

In one embodiment the toilet frame may comprise at least two weight sensors. For example, a first weight sensor may be disposed between one of the lower and upper struts and a second weight sensor may be disposed between the other of the lower and upper struts. In another embodiment two or more weight sensors may be disposed between each of the lower and upper struts.

In an embodiment the foot plate may be positioned on the floor, in use. In another embodiment the foot plate may be suspended from the upper support frame such that loads applied to the footplate are passed through the weight sensors on the load path between the upper support frame and the lower support frame.

In another embodiment the foot plate may be rotatably coupled to the support frame. The foot plate may be moveable from a deployed position in which the foot plate is positioned on the floor and a stored position. The stored position may be a position in which the foot plate extends generally vertically such that a patient may sit on or stand up from the toilet frame without standing on the foot plate.

In one embodiment the foot plate may comprise a distal edge and the distal edge of the foot plate is may be a wedge or a ramp. This is beneficial as the wedge reduces the chance of a patient tripping on the foot plate when the patient is sitting on or standing from the toilet frame. In another embodiment the wedge or ramp may extend along one or more side edges of the foot plate.

In another embodiment the toilet frame may comprise a foot plate weight sensor configured to measure a first component of the patient's weight applied to the foot plate by the patient's feet. This is beneficial as the component of the patient's weight applied to the foot plate may be used to determine the total weight of the patient. The weight sensor may be configured to measure a second component of the patient's weight applied to the seat by the patient. The foot plate may comprise four foot plate weight sensors positioned on the underside of the foot plate. Each foot plate weight sensor may comprise an adjustable foot and the foot plate weight sensor may be disposed between the foot and the underside of the foot plate.

The toilet frame may further comprise a processor or control module configured to determine the total weight of the patient in dependence on the measured first and second components of the patient's weight. The processor may be configured to receive a first weight measured by the weight sensor and a second weight measured by the foot plate weight sensor and determine the total weight of the patient in dependence on the measured first and second weights.

In one embodiment the seat may comprise a lower seat portion and an upper seat portion. This is beneficial as the upper seat portion may be mounted on the upper support frame and subsequently secured to the upper support frame by joining the lower seat portion to the upper seat portion to surround a portion, for example the upper strut, of the support frame.

The upper seat portion may comprise an inner flange extending around the aperture. Furthermore, an outer flange may extend around the periphery of the upper seat portion. The lower seat portion may be at least partially received between the inner flange and the outer flange to define a cavity between the lower and upper seat portions. A top edge of the outer flange may comprise a fillet extending around an outer surface of the outer flange. Furthermore, a top edge of the inner flange may comprise a fillet extending around an inner side of the inner flange. The fillets may beneficially promote fluids or liquid to run-off the seat instead of pooling on an inner surface of the lower seat portion. This beneficially prevents the ingress of moisture within the seat cavity.

In one embodiment the toilet frame may comprise a bowl positioned beneath the aperture such that bodily fluids received by the aperture are gathered within the bowl. This is beneficial as the toilet frame may be used as a commode at a patient's bedside without the need for a conventional toilet. For example, where a patient is too weak or frail to travel from their bed to the toilet. The bowl may be used in isolation or a cardboard container may be positioned within the bowl to receive the bodily fluids. The bowl may be a cardboard commode bowl.

In an embodiment the underside of the seat may comprise a lip for suspending a bowl beneath the seat, in use. The bowl may be suspended beneath the aperture such that bodily fluids received by the aperture are gathered within the bowl. The lip may extend around a substantial portion of the aperture. For example, the lip may be generally U-shaped that extends around the aperture. The U-shaped lip may be shaped to allow the bowl to be slidably fitted or removed from the underside of the seat. For example, the U-shaped lip may have an L-shaped sectional profile. Furthermore, the U-shaped lip may have an open side for slidably receiving the bowl. The open section may be positioned at the rear of the toilet frame such that the bowl is attached to or removed from the toilet frame from the rear side.

The support frame may comprise a pair of longitudinally extending supports configured to support or suspend a bowl beneath the aperture. The bowl may be suspended from the supports. Furthermore, the bowl may be slidably removed or inserted to the toilet frame by sliding the bowl along the supports. In an embodiment the longitudinal extending supports may be mounted on the underside of the seat. The longitudinal supports may extend longitudinally on opposing sides of the aperture.

In another embodiment the support frame may comprise four legs. Two of the legs may comprise wheels for moving the toilet frame. This is beneficial as the toilet frame may be wheeled from a toilet where it is used as a toilet support frame to a patient's bedside where the toilet frame may be fitted with a bowl such that the toilet frame may be used as a commode. Thus, a patient may be weighed at their bedside by wheeling the toilet frame to the patient's bedside for use as a commode.

In one embodiment the seat and/or the foot plate are a bright or contrasting colour, for example red. This is beneficial as the bright colour may attract the attention of a patient thereby making it easier to direct a patient to sit on the seat and place their feet on the foot plate. This is particularly beneficial for visually impaired patients or patients diagnosed with dementia.

According to a further aspect of the present invention there is provided a commode for measuring the weight of a patient when the patient is sat on the commode, the commode comprising: a toilet frame as described in any one of the aforementioned aspects or embodiments; and a commode bowl suspended beneath the aperture of the seat for receiving bodily fluids.

The toilet frame beneficially may be fitted with a commode bowl and used as a commode at a patient's bedside. This is particularly beneficial for both allowing frail or immobile patients to go to the toilet and also be weighed simultaneously at their bedside.

According to a further aspect of the present invention there is provided a method of weighing a patient using a toilet frame, the toilet frame comprising a seat and a foot plate, the method comprising: measuring a first component of the patient's weight applied to the foot plate by the patient; measuring a second component of the patient's weight applied to the seat by the patient; and determining a total weight of the patient in dependence on the measured first component of the patient's weight and the measured second component of the patient's weight.

This method beneficially allows the weight of a patient to be accurately measured whilst the patient is going to the toilet using the toilet frame. As such, the weight of the patient may be regularly measured such that fluctuations in the patient's weight may be determined. Furthermore, the method allows the weight of the patient to be accurately determined whilst the patient is sat in a comfortable position on the toilet.

In one embodiment the method may comprise measuring the first component of the patient's weight using a foot plate weight sensor for measuring a load applied to the foot plate. Measuring the second component of the patient's weight may comprise using a weight sensor for measuring a load applied to the seat.

In an embodiment the method may comprise measuring the second component of weight using a weight sensor for measuring a load applied to an upper support frame. The seat may be mounted on the upper support frame. Furthermore, the foot plate may be mounted on or form part of the upper support frame.

In another embodiment the method may be preceded by moving the foot plate from a stored position to a deployed position. This is beneficial as a patient may sit on the toilet frame when the foot plate is in the stored position and the foot plate may then be moved to the deployed position such that the patient may place their feet on the foot plate when they are sat on the toilet frame. The method may further comprise returning the foot plate to the stored position from the deployed position. This may be done prior to the patient standing up from the toilet frame to facilitate easier egress from the toilet frame.

In a further embodiment determining the total weight of the patient may comprise summing the first component of the patient's weight with the second component of the patient's weight. The determined total weight of the patient may be displayed on a display and the display may be mounted on an armrest of the toilet frame.

The invention may be expressed as a toilet frame comprising a seat including an upper surface to receive an individual, such as a patient. The seat providing access to a container defining an interior volume configured to receive bodily fluid; wherein at least one transducer is disposed beneath an upper surface of the seat, said transducer being configured to determine a weight of the individual.

Within the scope of this application, it is expressly intended that the various aspects, embodiments, examples and alternatives set out in the preceding paragraphs, and/or in the following description and drawings, and in particular the individual features thereof, may be taken independently or in any combination.

BRIEF DESCRIPTION OF THE SEVERAL VIEWS OF THE DRAWINGS

One or more embodiments of the invention will now be described, by way of example only, with reference to the accompanying drawings.

DETAILED DESCRIPTION OF THE INVENTION

In general terms embodiments of the invention relate to a toilet frame, a toilet support frame or a commode for weighing a patient whilst they are sat on the toilet frame. The toilet frame comprises a seat with an aperture for receiving bodily fluids and a support frame for supporting the seat. The support frame beneficially allows the toilet frame to be positioned over a toilet such that bodily fluids received by the aperture may be passed to the toilet or received within a bowl suspended beneath the aperture. The seat may be coupled to or mounted on the support frame by a plurality of weight sensors that are configured to determine the weight of the patient sat on the seat.

The toilet frame may further comprise a foot plate upon which the patient may place their feet whilst they are sat on the toilet frame such that the patient may rest their feet on the foot plate. The foot plate may comprise weight sensors such that the component of the patient's weight being passed through or applied to the foot plate may be determined. Thus, the total weight of the patient may be determined by evaluating the component of weight detected by the weight sensors located under the seat and also by the component of weight detected by the weight sensors located under the foot plate.

Weighing a patient whilst they are sat on the toilet frame is beneficial as it enables hospital staff to accurately measure the weight of the patient without having to move them to a pair of conventional weighing scales. Thus, the number of times a patient has to be moved from their bed in a day is reduced and furthermore by weighing the patient daily on the toilet frame the weight of the patient may be tracked and monitored accurately. This is particularly advantageous for elderly patients or critically ill patients where it is desirable to minimise the number of times the patient is moved from their bed.

Figure 1:
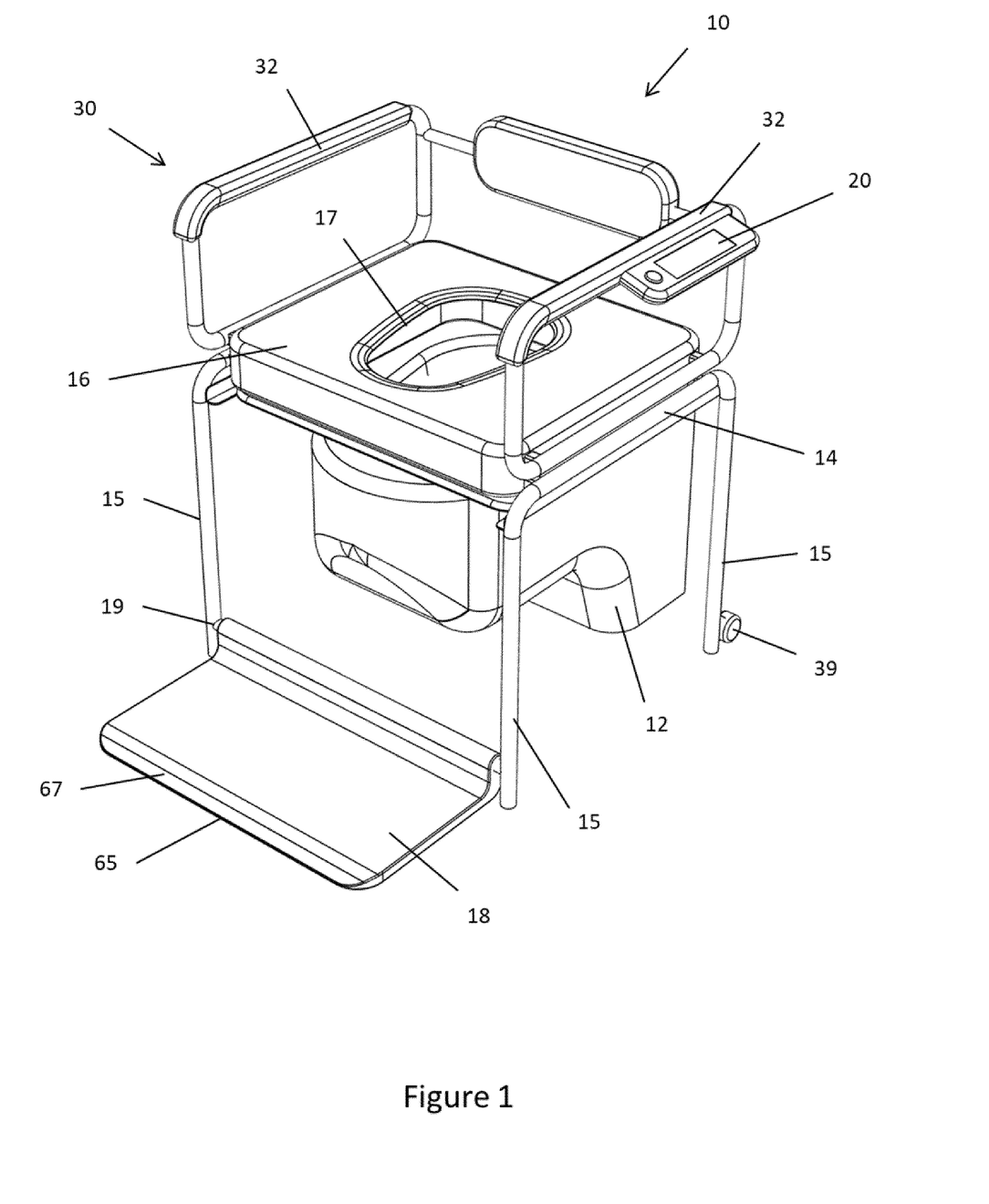
FIG. 1 is a perspective view of a toilet frame according to an embodiment of the invention positioned over a toilet.

To place embodiments of the invention in a suitable context reference will firstly be made to FIG. 1 which shows a perspective view of a toilet frame 10 positioned over a toilet 12. The toilet frame 10 comprises a lower support frame 14 with four support legs 15 and a seat 16. The seat 16 comprises an aperture 17 extending through the seat 16 for receiving bodily fluids which may be passed to the toilet 12 or received within a bowl (not shown in FIG. 1) suspended beneath the seat 16.

As shown in FIG. 1, the toilet frame 10 further comprises a foot plate 18 upon which a patient may place their feet when they are sat on the seat 16 of the toilet frame 10. The foot plate 18 is rotatably coupled to the lower support frame 14 via the lateral member 19 such that the foot plate 18 is moveable between a deployed position (as shown in FIG. 1) and a stored position.

When the foot plate 18 is in the deployed position the bottom surface of the foot plate 18 is configured to lie substantially parallel to the floor. As shown in FIG. 1, the bottom surface may contact the floor, or a plurality of feet may contact the floor such that the bottom surface of the foot plate 18 is elevated off the floor when in the deployed position. To move the foot plate 18 to the stored position the foot plate 18 is turned through about 90° such that the foot plate 18 is arranged substantially vertically between the front legs 15.

The toilet frame 10 further comprises a series of weight sensors (not shown in FIG. 1) that are configured to determine the weight of a patient sat on the seat 16 of the toilet frame 10. The weight sensors may be disposed between the seat 16 and the lower support frame 14 and further foot plate weight sensors may be disposed beneath the footplate 18. This is beneficial as the weight of a patient may be measured whilst the patient is sat on the toilet frame 10 in dependence on a load applied to the seat 16 and to the foot plate 18. The toilet frame 10 further comprises a display 20 mounted on an armrest of the toilet frame 10 to display the weight of the patient to a nurse or carer.

Figure 2:
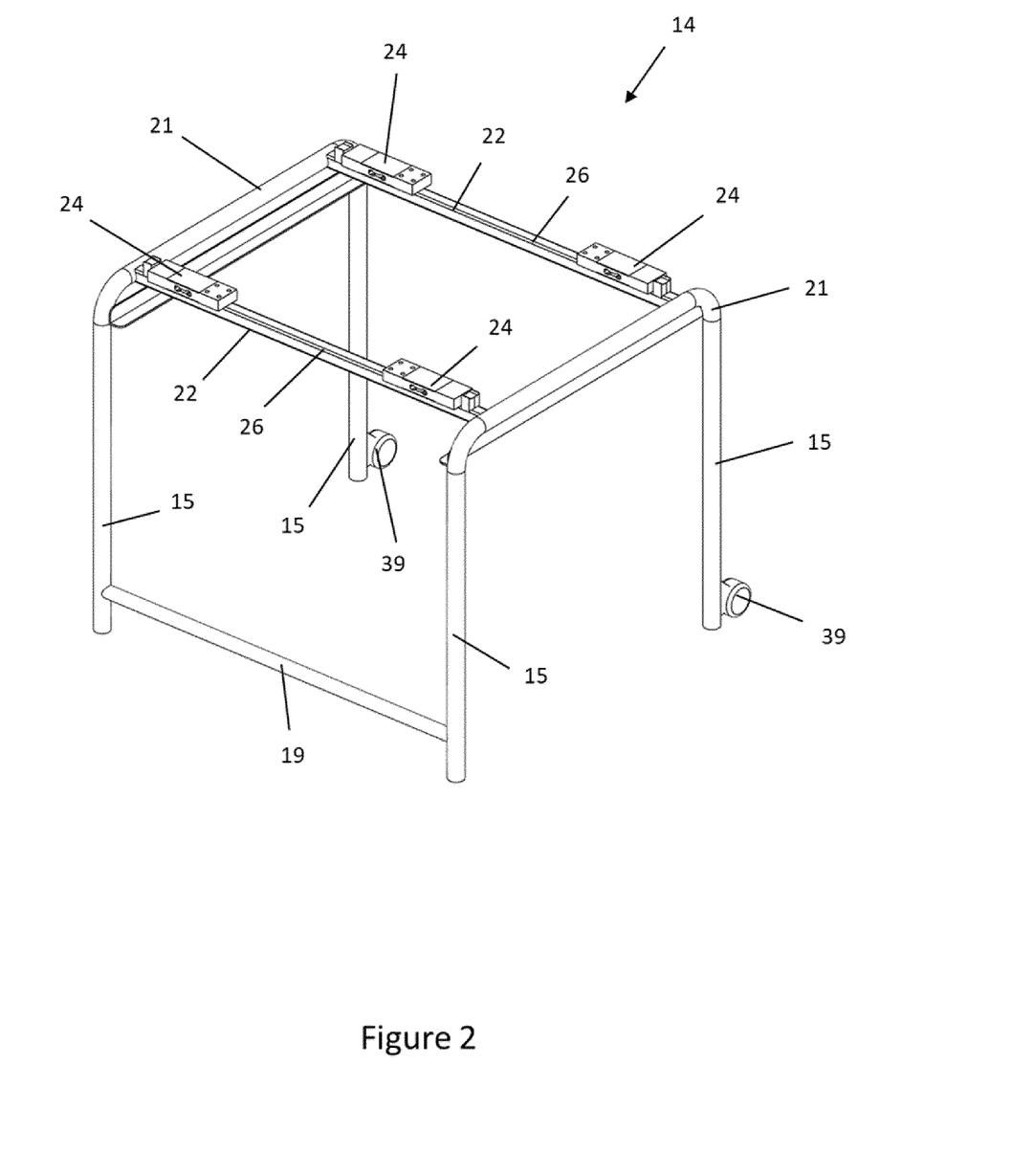
FIG. 2 is a perspective view of a lower support frame of the toilet frame of FIG. 1.

Turning now to FIG. 2 there is shown a perspective view of the lower support frame 14. The lower support frame 14 comprises four legs 15 formed from two U-shaped tubular metal structures 21. The U-shaped tubular structures 21 are joined by two laterally extending lower support struts 22 to form the lower support frame 14. Each rear leg 15 comprises a wheel 39 to allow the toilet frame 10 to be moved when it is not in use. For example, the wheels 39 may allow the toilet frame to be wheeled to a bedside such that the toilet frame 10 may be used as a commode. To move the toilet frame 10 the toilet frame 10 may be inclined in a rearward direction to lift the legs 15 off the ground and to bring the wheels 39 into contact with the ground such that the toilet frame 10 can be moved.

A further lateral member 19 extends between the two front legs 15 of the lower support frame 14 and is positioned proximally to the base of the front legs 15. The lateral member 19 is configured to provide strength to the lower support frame 14 and further provide a mount for the foot plate 18.

As shown in FIG. 2, four weight sensors 24 are mounted on the top surface 26 of the lower support struts 22. The weight sensors 24 are located at opposing ends of the struts 24 such that two weight sensors 24 are mounted on the top surface 26 of each lateral strut 22. However, the skilled reader will understand that any number of weight sensors 24 may be arranged on each lower support strut 22. For example, each lateral strut 22 may comprise one weight sensor 24 or three or more weight sensors 24.

Figure 3:
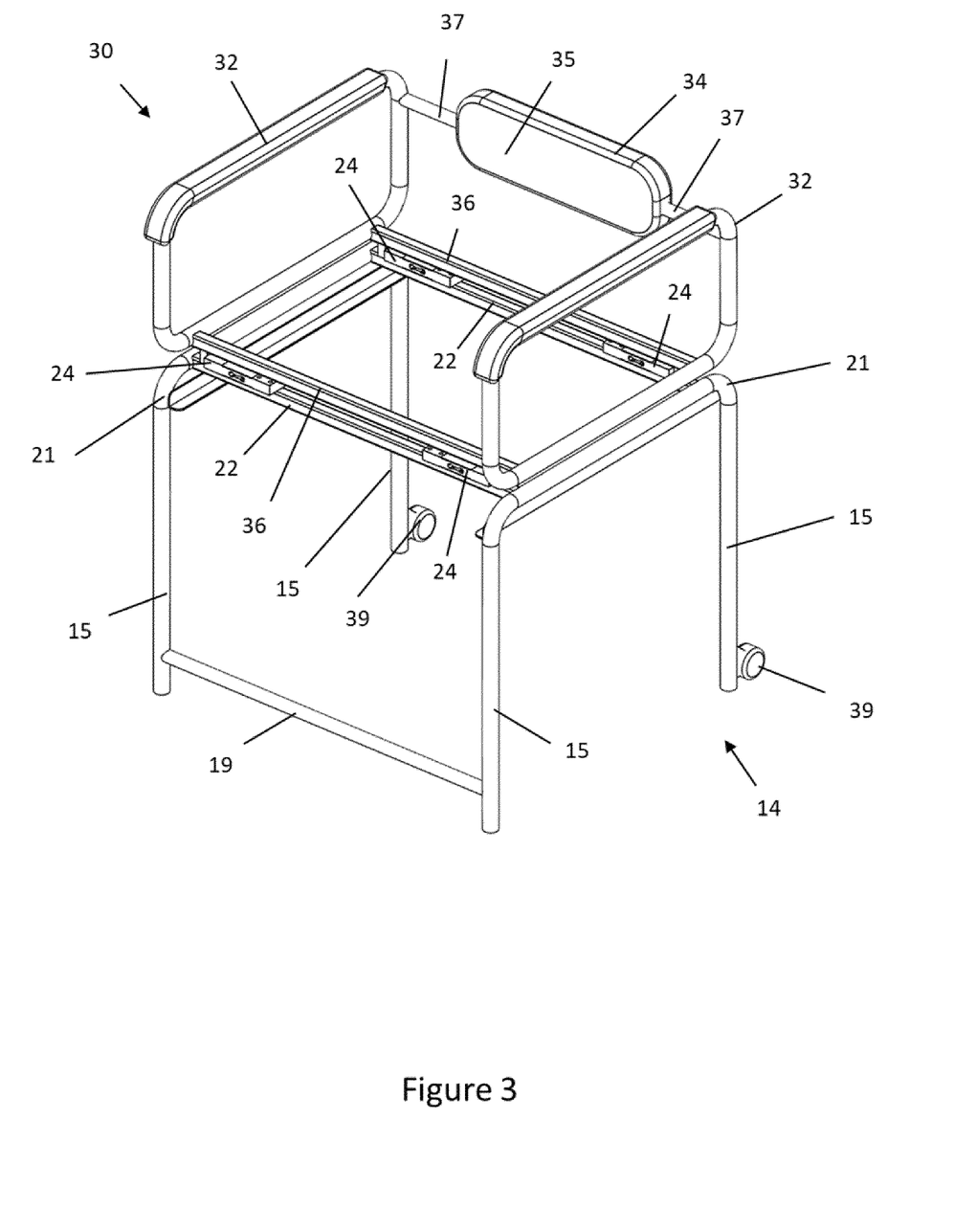
FIG. 3 is a perspective view of an upper support frame mounted on the lower support frame of FIG. 2.

Referring now to FIG. 3, the lower support frame 14 is shown with an upper support frame 30 mounted on the lower support frame 14. The upper support frame 30 is secured to the lower frame 14 by the weight sensors 24 thereby defining a load path extending from the upper support frame 30 to the lower support frame 14 via the four weight sensors 24. As such, loads applied to the upper support frame 30 may be measured by the weight sensors 24 positioned between the lower support frame 14 and the upper support frame 30.

The upper support frame 30 comprises two arm rest members 32 joined by a back rest 34 and further comprises two laterally extending upper struts 36. The arm rest members 32 are generally rectangular structures formed from tubular metal. The upper surface of the arm rest members 32 provide a surface upon which a user may rest their arms or grip to assist the patient sitting on and standing from the toilet frame 10. The arm rest members 32 form part of the upper support frame 30 such that a patient sat on the toilet frame 10 may rest their arms on the arm rest members 32 and the weight of their arms are measured by the weight sensors 24.

The backrest 34 is secured to and extends between a rear surface of the armrest members 32 thereby adjoining the two armrest members 32. The backrest 34 comprises a cushioned surface 35 that may provide support to a user's back when they are sat on the toilet frame 10. Furthermore, the back rest 34 comprises two bars 37 extending from opposing sides of the cushioned surface 35 and joined to each arm rest 32. The bars 37 beneficially support the cushioned surface 35 and furthermore act as handles to facilitate movement of the toilet frame 10. For example, a nurse may grip the bars 37 to tip the toilet frame 10 on to the wheels 39 on the back legs 15 such that the toilet frameIO may be moved.

As shown in FIG. 3, when the upper support frame 30 is mounted on the lower support frame 14 each lower strut 22 is aligned vertically with a respective upper strut 36. This is beneficial as the weight sensors 24 can be positioned on the lower strut 22 such that the respective upper struts 36 may be mounted or secured to the weight sensors 24. As such the upper support frame 30 is secured to the weight sensors 24, and thus the lower support frame 14 via the underside of the laterally extending upper support struts 36. The load path therefore extends from the upper support frame 30 to the lower support frame 14 via the weight sensors 24 positioned between the lower and upper struts 22, 36.

This is beneficial as when a user sits on the toilet frame 10 the weight of the patient is transferred through the upper support frame 30 to the lower support frame 14 via the weight sensors 24. Furthermore, a patient may rest their arms on the armrests 32 whilst sat on the toilet frame 10 and the weight of the patient may be passed through the load path connecting the upper support frame 30 and the lower support frame 14.

When the upper support frame 30 is mounted on the lower support frame 14 the front upper strut 36 is positioned vertically above the front lower strut 22. Similarly, the rear upper strut 36 is positioned vertically above the rear lower strut 22. As such, the respective lower and upper struts 22, 36 are aligned vertically when the upper support frame 30 is mounted on the lower support frame 14. Furthermore, a gap is defined between the lower and upper struts 22, 36 as a result of the weight sensors 24 disposed between the lower and upper struts 22, 36.

Figure 4:
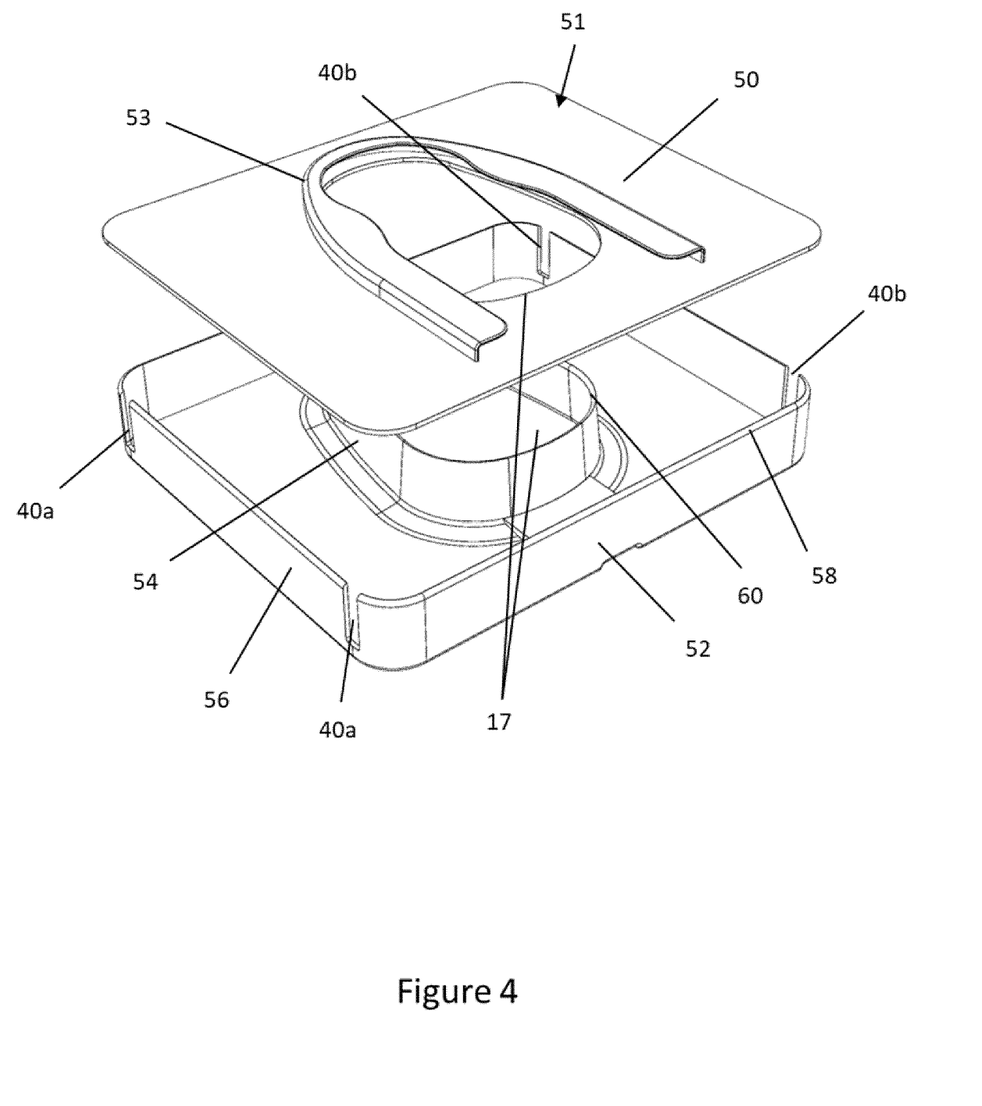
FIG. 4 is an exploded perspective view of the underside of a seat of the toilet frame of FIG. 1.

FIG. 4 shows an exploded perspective view of the underside of the seat 16. The seat 16 is formed from a lower seat portion 50 and an upper seat portion 52. The upper seat portion 52 comprises an inner flange 54 that surrounds the aperture 17 of the seat 16. The upper seat portion 52 further comprises an outer flange 56 that extends around the periphery of the upper seat portion 52. Both the inner flange 54 and outer flange 56 extend downwardly, away from the top surface of the seat 16.

The lower seat portion 50 may be secured to the upper seat portion 52 to form the seat 16. The lower seat portion 50 may be at least partially received between the inner flange 54 and outer flange 56 such that the lower seat portion 50 lies substantially flush with the rims of the inner and outer flanges 54, 56. When the lower seat portion 50 is secured to the upper seat portion 52 a cavity is defined between the lower and upper seat portions 50, 52. The external side of the rim or top edge of the outer flange 56 comprises a fillet 58 and the internal side of the inner flange 54 also comprises a fillet 60. The fillets 58, 60 beneficially prevent the ingress of moisture or fluids within the cavity of the seat 16 by promoting fluids to run-off or drip off the seat 16 to the toilet 12 positioned below the toilet frame 10.

As shown in FIG. 4, the upper seat portion 52 further comprises two pairs of slots 40a, 40b on the outer flange 56. The slots 40a, 40b are aligned on opposing sides of the upper seat portion 52 such that the respective lower and upper struts 22, 36 may be received within the slots 40a, 40b. When the seat 16 is secured to the upper support frame 30 each upper support strut 36 and the corresponding lower support strut 22 may be received within the respective slots 40. As such, the slots 40a, 40b may accommodate both the lower and upper support strut 22, 36.

The lower surface 51 of the lower seat portion 50 further comprises a lip 53 for supporting or suspending a commode bowl beneath the lower surface 51 of the seat 16. The lip 53 comprises an L-shaped sectional profile that extends in a generally U-shape around the aperture 17 on the lower surface 51 of the seat 16. As shown in FIG. 4 the lip 53 extends around a major portion of the aperture 17. The lip 53 beneficially allows a commode bowl to be slidably fitted or removed via the open end of the lip 53. Furthermore, the lip 53 protrudes from the lower surface 51 of the seat by between about 1 cm-5 cm. The relatively low profile of the lip 53 beneficially allows the toilet frame 10 to be positioned over the toilet 12 without the lip 53 clashing with the toilet 12 thereby allowing the toilet frame 10 to be used as a commode if required.

Figure 5:
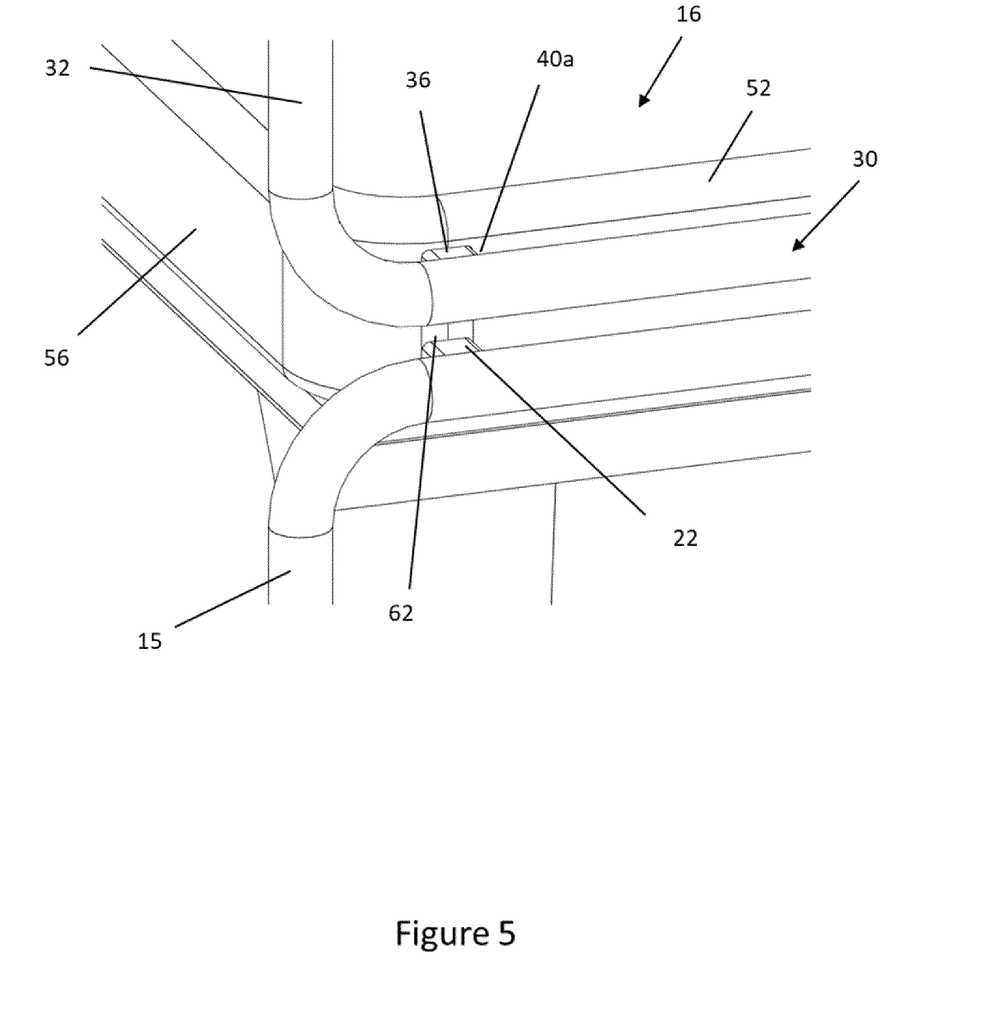
FIG. 5 is a detailed perspective view of the seat mounted on the upper support frame.

Turning now to FIG. 5, an enlarged perspective view of the slot 40a of the seat 16 mounted on the upper support frame 30 is shown. As shown in FIG. 5 both the front lower strut 22 and front upper strut 36 are aligned vertically and received or accommodated within the slot 40a when the seat 16 is mounted on the upper support frame 30.

A stopper or plug 62 is positioned within the slot 40a such that the gap between the lower and upper struts 22, 36 is filled. This is beneficial as the plug 62 prevents ingress of dirt and moisture within the seat 16 and furthermore provides a flush outer surface which may be cleaned easily. The plug 62 may be made from a soft plastics material to both prevent the ingress of moisture or dirt and further to allow relative movement between the upper strut 36 and the lower strut 22 when a patient sits in the toilet frame 10.

The slots 40a, 40b provide clearance to allow movement of the seat 16 in the vertical axis such that when a patient sits on the seat 16 the seat 16 and upper support frame 30 may move relative to the lower support frame 14. This is beneficial as the seat 16 may move by between about 0.1 mm and 2 mm when a patient sits on the seat 16. The plug 62 may be made from a soft plastics material such that when a patient sits on the seat 16 and the upper strut 36 moves downwardly, towards the lower strut 22 the plug 62 may deform to facilitate movement of the upper strut 36. This promotes the loading applied to the seat 16 by the patient to go through the weight sensors 24.

Figure 6:
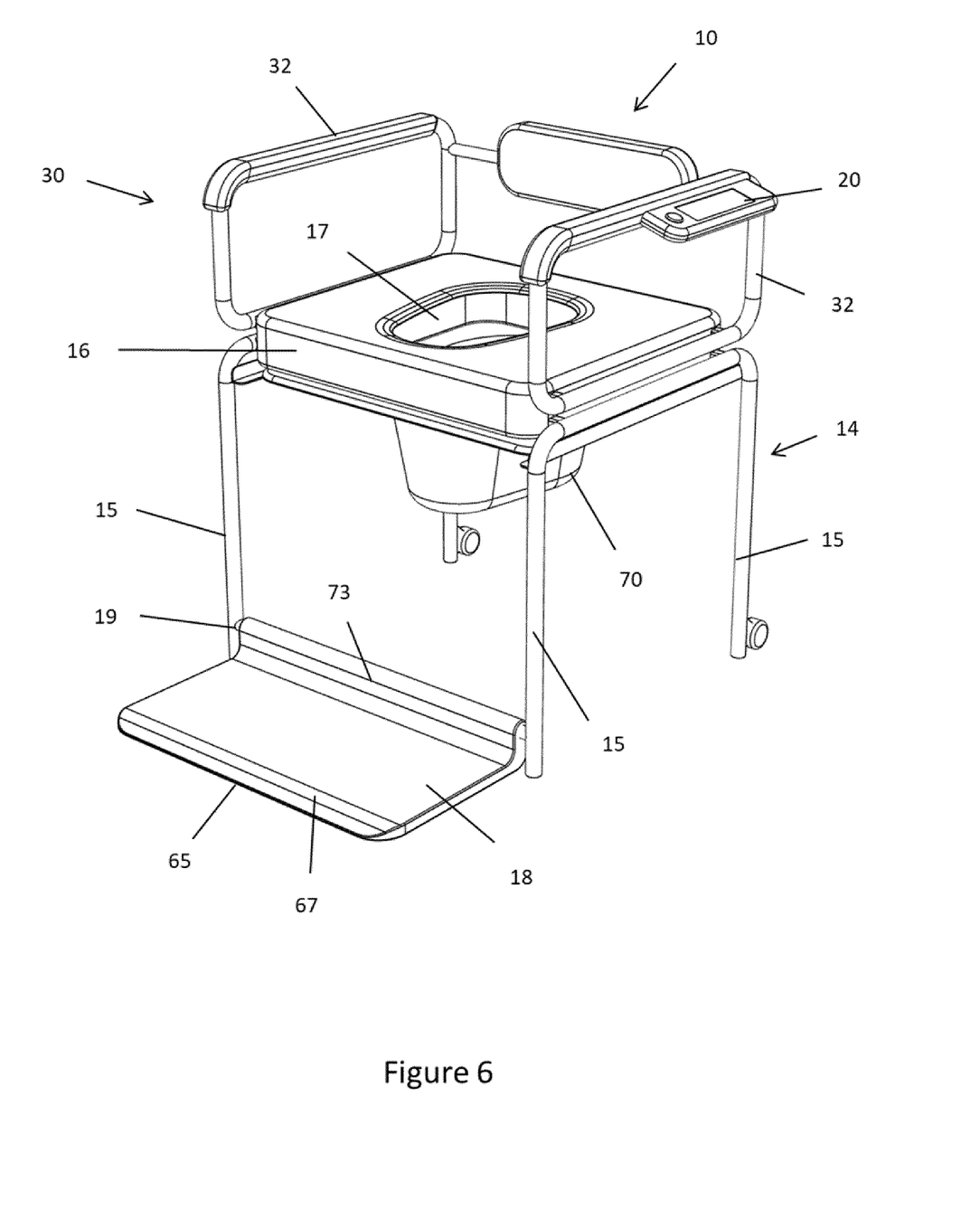
FIG. 6 is a perspective view of the toilet frame of FIG. 1 comprising a bowl.

FIG. 6 shows a perspective view of the toilet frame 10 with the foot plate 18 in the deployed position. The toilet frame 10 shown in FIG. 6 is fitted with a commode bowl 70 such that the toilet frame 10 may be used as a commode. The commode bowl 70 shown in FIG. 6 may be suspended by the lip 53 on the underside 51 of the seat 16.

When the foot plate 18 is in the deployed position the foot plate 18 lies substantially parallel to the ground. The base of the foot plate 18 may contact the ground or feet (not shown in FIG. 6) may contact the ground and support the foot plate 18. When the patient sits on the seat 16 of the toilet frame 10 the patient may place their feet on the foot plate 18 such that the foot plate 18 supports the patient's feet. The foot plate 18 comprises foot plate weight sensors (not shown in FIG. 6) for determining the component of the patient's weight being applied to the foot plate 18 by the patient's feet.

The foot plate weight sensors advantageously allows the patient's weight to be determined accurately by evaluating a load determined by the weight sensors 24 within the seat 16 and from foot plate weight sensors located within the foot plate 18.

As shown in FIG. 6 a distal edge 65 of the foot plate 18 comprises a ramp 67 or wedge. The ramp 67 beneficially reduces the likelihood of a patient tripping or catching their feet as they sit on or stand up from the foot plate 10. The skilled reader will understand that the ramp 67 may extend around all the peripheral edges of the foot plate 18 in another embodiment.

The foot plate 18 further comprises an engagement formation 73 positioned on a proximal side of the foot plate 18. The engagement formation 73 is configured to rotatably couple the foot plate 18 to the lateral member 19 of the lower support frame 14. The engagement formation 73 may comprise a hook, passage, clip or the like for rotatably coupling the foot plate 18 to the lateral member 19. Furthermore, the engagement formation 73 may be configured such that the frictional forces between the engagement formation 73 and the lateral member 19 may retain the foot plate 18 in the stored position thereby preventing the foot plate 18 falling to the deployed position when the toilet frame 10 is being moved or when a patient is standing up from the toilet frame 10.

Figure 7:
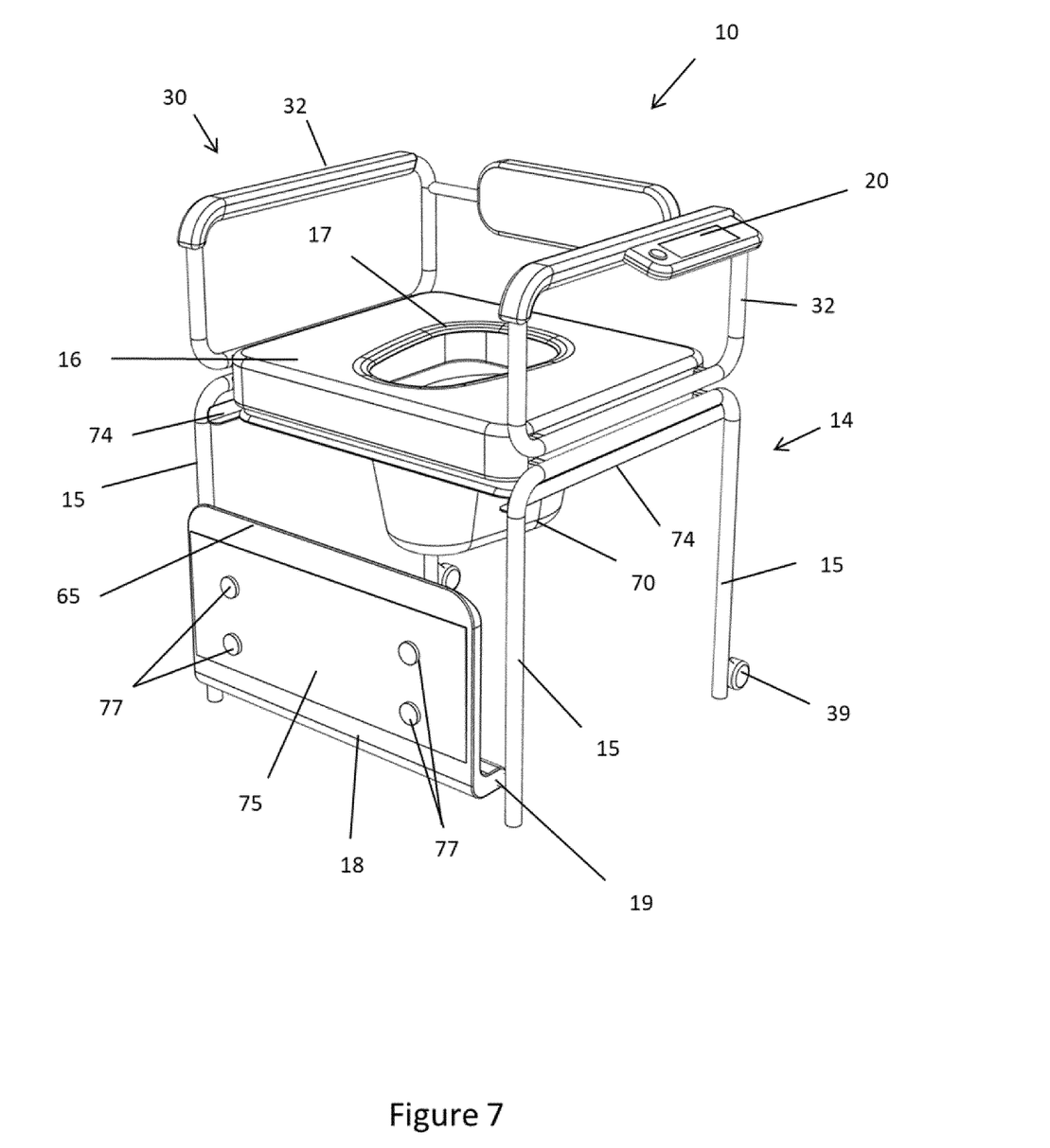
FIG. 7 is perspective view of the toilet frame of FIG. 6 with the foot plate in a stored position.

Turning now to FIG. 7, the foot plate 18 is shown in the stored position. When the foot plate 18 is in the stored position the foot plate 18 extends generally vertically in an upwards direction. This is beneficial as it allows a patient to easily access the seat 16 and furthermore facilitates easier movement of the toilet frame 10.

As shown in FIG. 7 the underside 75 of the foot plate 18 comprises four foot plate weight sensors 77 disposed on the underside 75 of the foot plate 18. The foot plate weight sensors 77 are configured to determine the component of the patient's weight applied to the foot plate 18 by the patient's feet. The foot plate weight sensors 77 may each comprise or be attached to an adjustable foot such that the foot maintains contact with the ground when the foot plate 18 is in the deployed position. The adjustable feet beneficially allow for variations or tolerances in the manufacturing of the toilet frame 10 or due to variations in the floor to ensure that all the feet of the foot plate 18 contact the floor.

Figure 8:
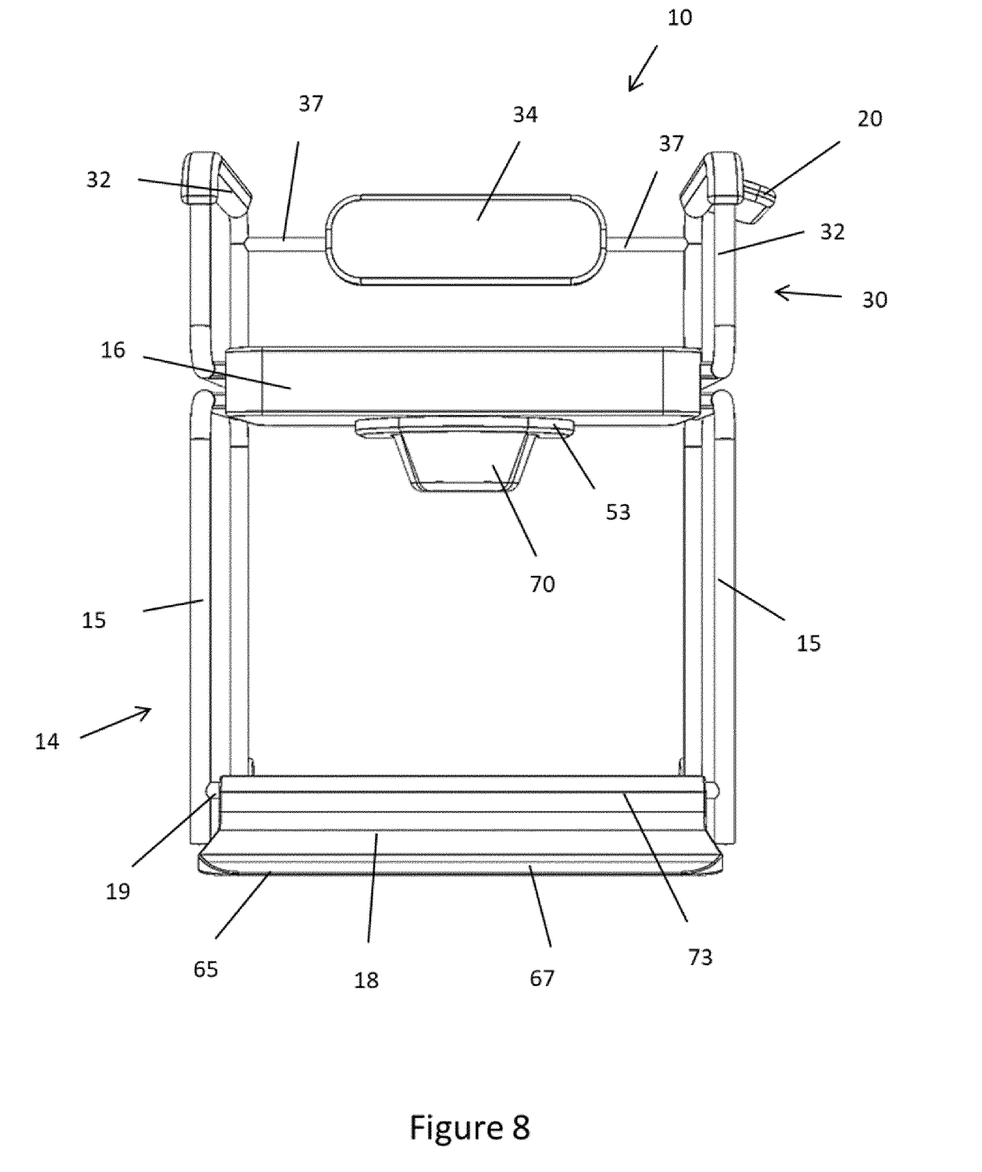
FIG. 8 is a front elevation view of the toilet frame of FIG. 6.

FIG. 8 shows a front view of the toilet frame 10 being used as a commode. The toilet frame 10 comprises a commode bowl 70 suspended from the lip 53 of the seat 16. The commode bowl 70 comprises a rim (not shown in FIG. 8) which may engage the lip 53 such that the commode bowl 70 may be suspended beneath the seat via the lip 53. Using the toilet frame 10 as a commode is beneficial for patients who are unable to travel to the toilet from their bed. In this situation the toilet frame 10 may be wheeled to the patient's bedside and a commode bowl 70 may be fitted to the toilet frame 10. The patient may then use the toilet frame 10 as a commode at their bedside whilst simultaneously being weighed by the toilet frame 10.

Figure 9:
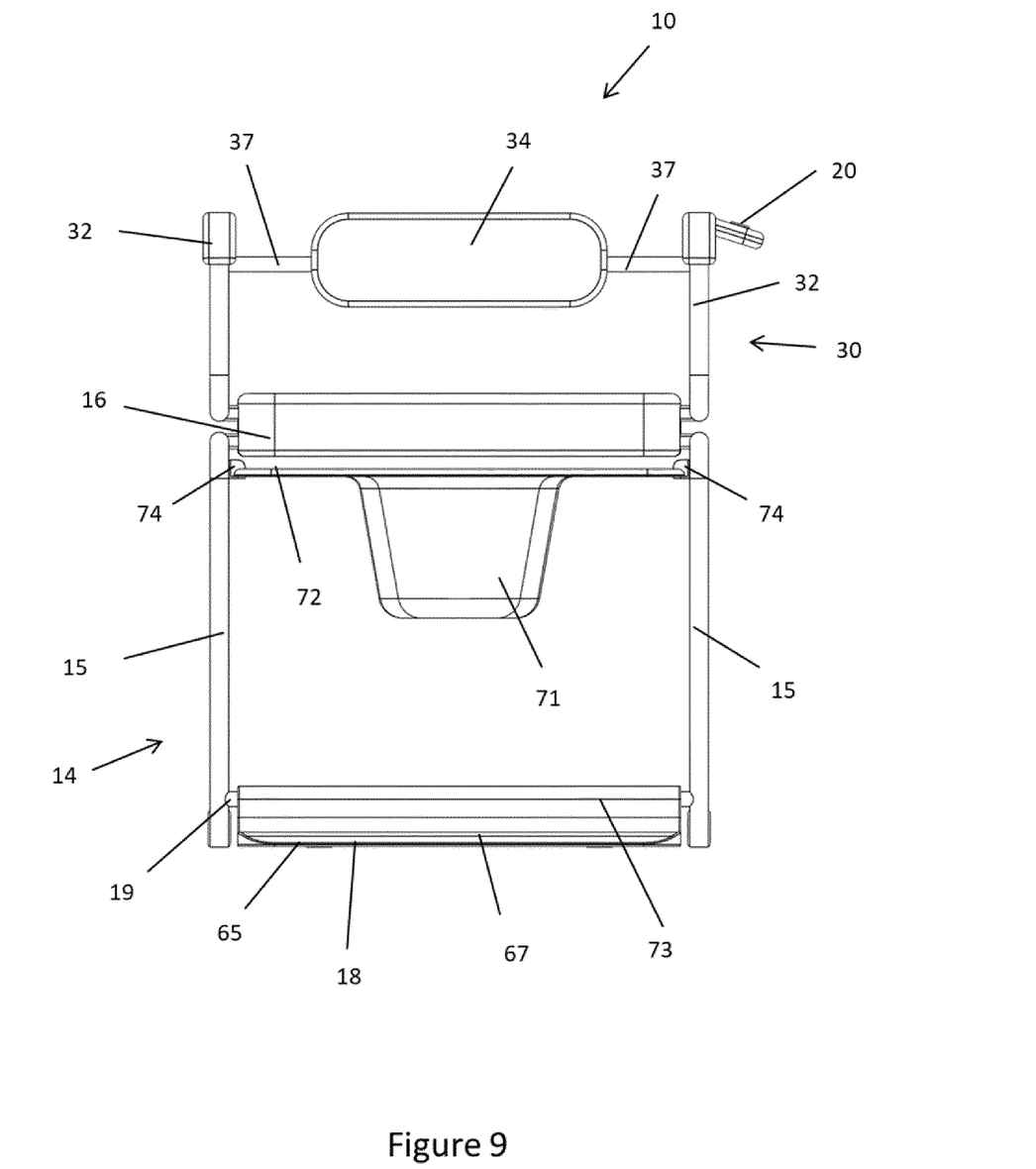
FIG. 9 is a front elevation view of a toilet frame according to a further embodiment.

FIG. 9 shows a front view of a toilet frame 10 fitted with a bowl 71 according to a further embodiment. As shown in FIG. 9, the bowl 71 comprises a planar flange 72 extending from the rim of the bowl 71. The flange 72 is dimensioned so as to engage the longitudinal supports 74 positioned on the lower support frame 14 or the underside of the seat 16. The longitudinal supports 74 are L-shaped brackets secured to the tops of the legs 15. The longitudinal supports 74 extend longitudinally in a fore-aft direction relative to the seat 16. This is beneficial as the bowl 71 may be slid along the supports 74 in an aft-direction to position the bowl 71 beneath the aperture 17 of the seat 16 and similarly may be slid in a fore-direction to remove the bowl 71 from the toilet frame 10. The bowl 71 may be easily removed such that the toilet frame 10 can be positioned over and used with a conventional toilet 12 if required. The bowl 71 may be a plastics tray configured to receive a conventional commode bowl 70 within the bowl 71 in use.

The seat 16 and foot plate 18 of the toilet frame 10 may be a bright colour that contrasts with the rest of the toilet frame 10. For example, the seat 16 and foot plate 18 may be red, such that the patient's attention is drawn to the surfaces that they should sit on and place their feet. This is particularly advantageous for patients who are visually impaired or that have dementia as the bright surface attracts their attention thereby making it easier for a carer to direct the patient to sit on the toilet frame 10.

Figure 10:
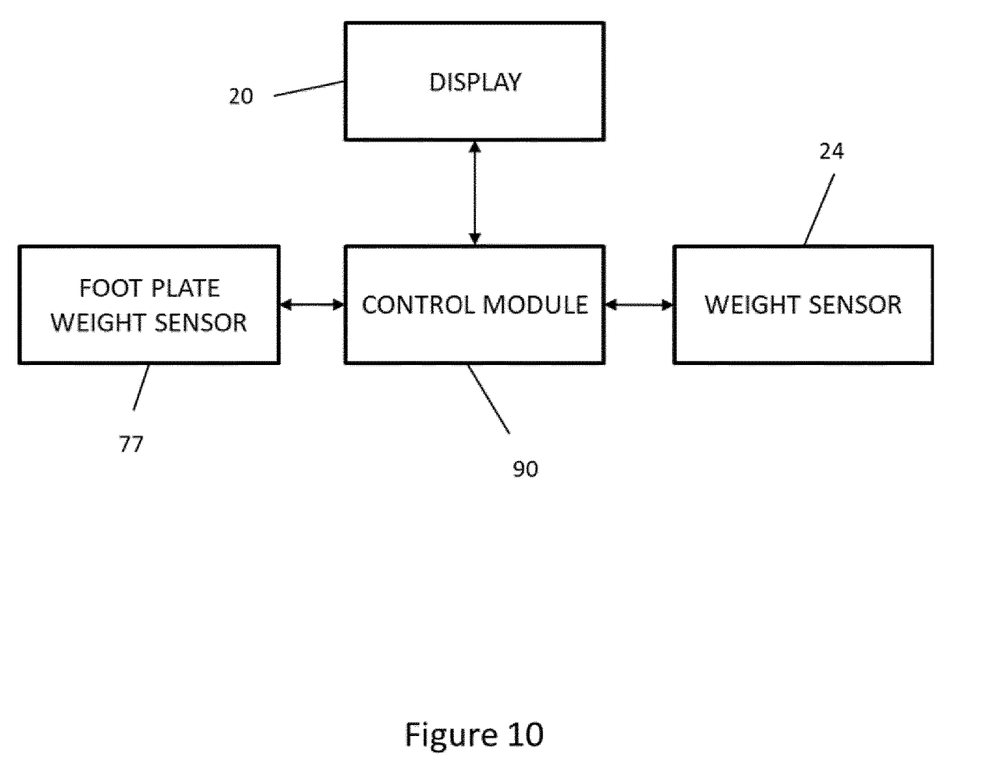
FIG. 10 is a schematic view of a block diagram of a control module, weight sensor, foot plate weight sensor and display of the toilet frame of FIG. 1.

Turning now to FIG. 10, a schematic block diagram of the weight sensors 24, foot plate weight sensors 77, display 20 and control module 90 is shown. The control module 90 is configured to receive weight data from the weight sensors 24 and from the foot plate weight sensors 77. The weight data may be indicative of two components of the patient's weight as measured by the foot plate weight sensors 77 and the weight sensors 24. Upon receipt of the weight data the control module 90 may evaluate the received weight data and determine the total weight of the patient sat on the toilet frame 10 in dependence on a first component of weight applied to the foot plate weight sensors 77 and a second component of weight applied to the weight sensors 24.

Figure 11:
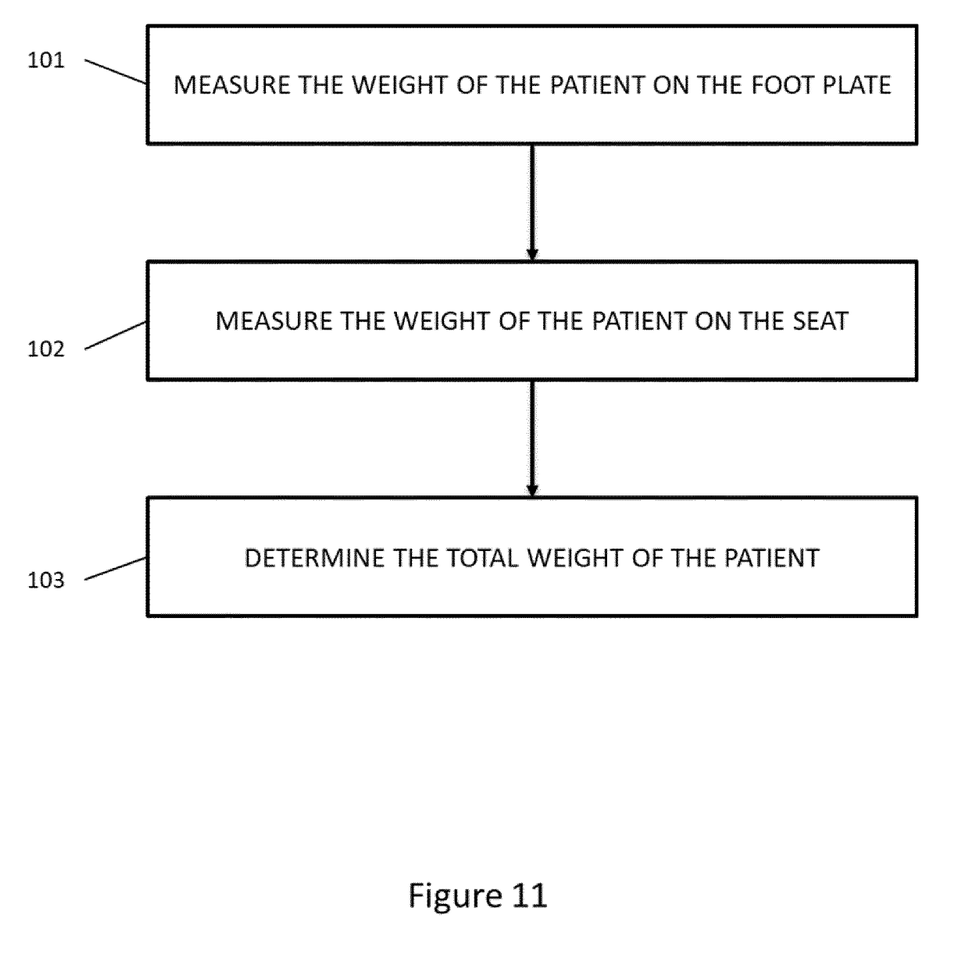
FIG. 11 is a flow chart outlining a method of determining the weight of a patient using a toilet frame.

FIG. 11 shows a flow chart outlining the method steps associated with measuring the weight of a patient using the toilet frame 10. The toilet frame 10 allows a patient to sit on the toilet frame 10 such that the patient may go to the toilet whilst simultaneously the total weight of the patient may be measured by the toilet frame 10.

In step 101 a first component of the patient's weight is determined. The first component of the patient's weight may be determined by measuring a load applied to the foot plate 18 by the patient's feet and legs. The first component of the patient's weight may be measured by foot plate weight sensors 77 disposed beneath the foot plate 18. Furthermore, determining the first component of the patient's weight may be preceded by moving the foot plate 18 from the stored position to a deployed position.

In Step 102 a second component of the patient's weight is determined. The second component of the patient's weight may be measured using weight sensors 24 disposed beneath the seat 16 of the toilet frame 10. Furthermore, the second component of the patient's weight may be measured by determining the load applied to the upper support frame 30 by the patient when the patient is sat on the seat 16.

In Step 103 the total weight of the patient is determined by evaluating the first component of the patient's weight and the second component of the patient's weight. Evaluating the first and second components of weight may comprise summing the two components to determine the total weight of the patient. When the total weight of the patient is determined the total weight may be displayed on a display 20 such that the weight of the patient may be noted. Furthermore, once the total weight of the patient is determined the foot plate 18 may be moved from the deployed position back to the stored position such that the patient may stand up from the toilet frame 10.

It will be appreciated that various changes and modifications can be made to the present invention without departing from the scope of the present application.

I claim:

1. A toilet frame for measuring the weight of a patient when the patient is sat on the toilet frame, the toilet frame comprising:
   a support frame;
   a seat mounted on the support frame, the seat comprising an aperture for receiving bodily fluids; and
   a foot plate for supporting the patient's feet;
   wherein the toilet frame further comprises a weight sensor configured to measure the weight of the patient when the patient is sat on the seat,
   wherein the footplate is rotatably coupled to the support frame,
   wherein the footplate is moveable from a deployed position in which the footplate is positioned on the floor and a stored position, and/or
   wherein the footplate comprises a distal edge and wherein the distal edge of the footplate is a wedge, and/or
   wherein the toilet frame comprises a foot plate weight sensor configured to measure a first component of the patient's weight applied to the foot plate by the patient's feet, and/or
   wherein the weight sensor is configured to measure a second component of the patient's weight applied to the seat by the patient and wherein the toilet frame comprises a processor configured to determine the total weight of the patient in dependence on the measured first and second components of the patient's weight.

2. The toilet frame, according to claim 1, wherein the toilet frame comprises an upper support frame mounted on the support frame by the weight sensor such that a load path extends from the upper support frame to the support frame via the weight sensor.

3. The toilet frame, according to claim 1, wherein the seat comprises a lower seat portion and an upper seat portion,
   wherein the upper seat portion comprises an inner flange extending around the aperture and an outer flange extending around the periphery of the upper seat portion,
   wherein the lower seat portion is at least partially received between the inner flange and the outer flange to define a cavity between the lower and upper seat portions,
   wherein a top edge of the outer flange comprises a fillet extending around an outer surface of the outer flange, and
   wherein a top edge of the inner flange comprises a fillet extending around an inner side of the inner flange.

4. The toilet frame, according to claim 1, wherein the toilet frame comprises a pair of longitudinally extending supports for suspending a bowl beneath the aperture such that bodily fluids received by the aperture are gathered within the bowl, in use, and/or
   wherein the support frame comprises four legs and wherein two of the legs comprise wheels for moving the toilet frame.

5. The toilet frame, according to claim 1, wherein an underside of the seat comprises a lip for suspending a bowl beneath the aperture such that bodily fluids received by the aperture are gathered within the bowl, in use,
   wherein the lip is generally U-shaped such that the lip extends around a substantial portion of the aperture, and
   wherein the lip is L-shaped in section and wherein the lip comprises an open side for slidably receiving the bowl.

6. A commode for measuring the weight of a patient when the patient is sat on the commode, the commode comprising:
   a toilet frame, according to claim 1; and
   a commode bowl suspended beneath the aperture of the seat for receiving bodily fluids.

7. A toilet frame for measuring the weight of a patient when the patient is sat on the toilet frame, the toilet frame comprising:
   a support frame;
   a seat mounted on the support frame, the seat comprising an aperture for receiving bodily fluids; and
   a foot plate for supporting the patient's feet;
   wherein the toilet frame further comprises a weight sensor configured to measure the weight of the patient when the patient is sat on the seat,
   wherein the toilet frame comprises an upper support frame mounted on the support frame by the weight sensor such that a load path extends from the upper support frame to the support frame via the weight sensor, wherein the weight sensor is disposed between the seat and the support frame, wherein the seat is secured to the upper support frame, wherein the upper support frame comprises a pair of arm rests, wherein a back rest extends between the pair of arm rests, wherein the upper support frame comprises a pair of upper struts, wherein the support frame comprises a pair of lower struts and wherein each lower strut is aligned vertically with a respective upper strut, wherein the seat is mounted on the pair of upper struts, wherein the seat comprises two pairs of slots and wherein each of the lower and upper struts are at least partially received within a respective slot, wherein a plug is at least partially received within a gap defined between the lower strut and the upper strut, wherein the toilet frame comprises at least two weight sensors, and wherein a first weight sensor is disposed between one of the lower and upper struts and a second weight sensor is disposed between the other of the lower and upper struts.

8. The toilet frame, according to claim 7, further comprising a display mounted on one of the arm rests for displaying the weight of the patient.

9. A method of weighing a patient using a toilet frame, the toilet frame comprising a seat and a foot plate, the method comprising:

measuring a first component of the patient's weight applied to the foot plate by the patient;

measuring a second component of the patient's weight applied to the seat by the patient; and determining a total weight of the patient in dependence on the measured first component of the patient's weight and the measured second component of the patient's weight.

10. The method of weighing, according to claim 9, further comprising:

measuring the first component of the patient's weight using a foot plate weight sensor for measuring a load applied to the foot plate; and measuring the second component of the patient's weight using a weight sensor for measuring a load applied to the seat.

11. The method of weighing, according to claim 9, further comprising measuring the second component of weight by measuring a load applied to an upper support frame, wherein the seat is mounted on the upper support frame.

12. The method of weighing, according to claim 9, preceded by moving the foot plate from a stored position to a deployed position.

13. The method of weighing, according to claim 12, comprising returning the foot plate to the stored position from the deployed position.

14. The method of weighing, according to claim 9, wherein determining the total weight of the patient comprises summing the first component and the second component of the patient's weight.

15. The method of weighing, according to claim 9, comprising displaying the determined total weight of the patient on a display wherein the display is mounted on an arm rest of the toilet frame.

16. A toilet frame for measuring the weight of a patient when the patient is sat on the toilet frame, the toilet frame comprising:

a support frame;

a seat mounted on the support frame, the seat comprising an aperture for receiving bodily fluids; and a foot plate for supporting the patient's feet;

wherein the toilet frame further comprises a weight sensor configured to measure the weight of the patient when the patient is sat on the seat, wherein the seat comprises a lower seat portion and an upper seat portion, wherein the upper seat portion comprises an inner flange extending around the aperture and an outer flange extending around the periphery of the upper seat portion, wherein the lower seat portion is at least partially received between the inner flange and the outer flange to define a cavity between the lower and upper seat portions, wherein a top edge of the outer flange comprises a fillet extending around an outer surface of the outer flange, and wherein a top edge of the inner flange comprises a fillet extending around an inner side of the inner flange.

17. The toilet frame, according to claim 16, wherein the toilet frame comprises an upper support frame mounted on the support frame by the weight sensor such that a load path extends from the upper support frame to the support frame via the weight sensor.

18. The toilet frame, according to claim 16, wherein the toilet frame comprises a pair of longitudinally extending supports for suspending a bowl beneath the aperture such that bodily fluids received by the aperture are gathered within the bowl, in use, and/or wherein the support frame comprises four legs and wherein two of the legs comprise wheels for moving the toilet frame.

19. The toilet frame, according to claim 16, wherein an underside of the seat comprises a lip for suspending a bowl beneath the aperture such that bodily fluids received by the aperture are gathered within the bowl, in use, wherein the lip is generally U-shaped such that the lip extends around a substantial portion of the aperture, and wherein the lip is L-shaped in section and wherein the lip comprises an open side for slidably receiving the bowl.

20. A commode for measuring the weight of a patient when the patient is sat on the commode, the commode comprising:

a toilet frame, according to claim 16; and a commode bowl suspended beneath the aperture of the seat for receiving bodily fluids.

* * * * *